Patented Dec. 22, 1936

2,065,474

UNITED STATES PATENT OFFICE 2,065,474

PRODUCTION OF POLYMERIZATION PRODUCTS FROM ISOBUTYLENE

Martin Mueller-Cunradi and Michael Otto, Ludwigshafen-on-the-Rhine, Germany, assignors to I. G. Farbenindustrie Aktiengesellschaft, Frankfort-on-the-Main, Germany No Drawing. Application January 25, 1934, Serial No. 708,256. In Germany January 28, 1933

5 Claims. (Cl. 260—2)

The present invention relates to the production of polymerization products from isobutylene.

It has been proposed by us in our copending application Serial No. 623,812 to produce hydrocarbons of high molecular weight by the polymerization of isobutylene in the presence of volatile inorganic halides, i. e. of catalysts of the Friedel-Crafts type, such as boron fluoride, phosphorus tri- or pentafluoride, or aluminium chloride, while continuously keeping, until the completion of the reaction by strong cooling, the reacting materials at low temperatures, as for example lower than 10° below zero centigrade. Mixtures which contain isobutylene and also, for example, olefines, may be employed instead of isobutylene.

We have now found that mixtures of the said kind can also be converted into valuable polymerization products of isobutylene at temperatures between 10° below zero and 100 C., for example at ordinary (i. e. room) or still more elevated temperatures by exposing the mixtures to the action of volatile inorganic halides for so short a time only that substantially only the isobutylene is polymerized. Products obtained in this way are generally speaking not of such high molecular weight as those obtainable at substantially lower temperatures. Products are obtained for example having the character of light to heavy mineral oils. The products, especially when employing boron fluoride as the polymerization catalyst, may be split up again by heating into isobutylene or dimeric or trimeric compounds of isobutylene. The process according to this invention thus renders it possible to obtain isobutylene or polymers thereof of low molecular weight in a pure form from mixtures of gases or liquids containing isobutylene, and these pure products may then be converted into high molecular polymerization products.

The following examples will further illustrate the nature of this invention but the invention is not restricted to these examples. The parts are by weight.

Example 1

A mixture of 1 part of isobutylene and 2.5 parts of normal butylene is caused to flow under a pressure of from 3 to 5 atmospheres and at ordinary (i. e. room) temperature while cooling strongly with water through a tube filled with Raschig rings and provided with a water cooling jacket. Boron fluoride is present in the tube under a partial pressure of about 0.25 atmosphere. If the said mixture be led so rapidly through the tube that it is only exposed to the action of the boron fluoride for about 1 minute, practically only the isobutylene is polymerized. For example if 350 grams be charged through the tube per minute, 325 grams of reaction product are obtained, 215 grams thereof distill off at ordinary (i. e. room) temperature; this consists of normal butylene containing at the most 0.4 per cent of isobutylene. The viscous liquid residue consists of 102 grams of an oil having the following boiling curve:

| | Per cent |
|---|---|
| Boiling up to 100° C | 4 |
| Boiling up to 200° C | 47 |
| Boiling up to 150° C. (15 millimeters) | 71 |
| Boiling up to 200° C. (0.06 millimeter) | 83 |
| Residue | 11 |
| Loss | 6 |

If this oil be distilled at between 300° and 400° C. over catalysts, such as active carbon or bleaching earths containing phosphoric acid, it is split up again into isobutylene.

Example 2

100 grams of isobutylene and 300 grams of normal butylene are shaken in an autoclave at 20° C. with 20 grams of titanium tetrachloride for about half an hour. By releasing the pressure 290 grams of normal butylene containing 4.5 per cent of isobutylene escape. 95 grams of an oil remain having the consistency of a lubricating oil.

Example 3

30 grams of isobutylene and 70 grams of normal butylene are stirred for 3 minutes at zero C with 3 grams of aluminium chloride. Water is then added for decomposing the aluminium chloride and the mass is distilled. 15 grams of an oil formed mainly from isobutylene are obtained, whereas the normal butylene occurs as such in the distillate.

What we claim is:

1. The process of selectively polymerizing isobutylene from mixtures containing isobutylene which comprises reacting such a mixture comprising isobutylene and at least one other olefine with a volatile inorganic halide catalyst of the Friedel-Crafts type at a temperature above 10° below zero C, but below 100° C., for a sufficiently short time, that substantially only the isobutylene is polymerized.

2. The process of selectively polymerizing isobutylene from mixtures containing isobutylene which comprises reacting such a mixture comprising isobutylene and at least one other olefine with boron fluoride at a temperature above 10° below zero C, but below 100° C., for a sufficiently short time, that substantially only the isobutylene is polymerized.

3. The process of selectively polymerizing isobutylene from mixtures containing isobutylene which comprises reacting such a mixture comprising isobutylene and at least one other olefine with a volatile inorganic halide catalyst of the Friedel-Crafts type at about room temperature for a sufficiently short time, that substantially only the isobutylene is polymerized.

4. The process of selectively polymerizing isobutylene from mixtures containing isobutylene which comprises reacting such a mixture comprising isobutylene and at least one other olefine with boron fluoride at about room temperature for a sufficiently short time, that substantially only the isobutylene is polymerized.

5. The process of separating isobutylene from normal butylene by selective polymerization which comprises reacting a mixture consisting of isobutylene and normal butylene with a volatile inorganic halide catalyst of the Friedel-Crafts type at a temperature above 10° below zero C., but below 100° C., for a sufficiently short time, that substantially only the isobutylene is polymerized.

MARTIN MUELLER-CUNRADI.
MICHAEL OTTO.